(12) United States Patent
Choi et al.

(10) Patent No.: US 10,521,690 B2
(45) Date of Patent: Dec. 31, 2019

(54) PICTOGRAM RECOGNITION APPARATUS, PICTOGRAM RECOGNITION SYSTEM, AND PICTOGRAM RECOGNITION METHOD

(71) Applicants: Hyundai Motor Company, Seoul (KR); Kia Motors Corporation, Seoul (KR); Maxst Co., Ltd., Seoul (KR)

(72) Inventors: Hangjip Choi, Bucheon-si (KR); Seung Gyun Kim, Seoul (KR); Jin Min Choi, Seoul (KR); Jae Wan Park, Ulsan (KR)

(73) Assignees: Hyundai Motor Company, Seoul (KR); Kia Motors Corporation, Seoul (KR); Maxst Co., Ltd., Seoul (KR)

( * ) Notice: Subject to any disclaimer, the term of this patent is extended or adjusted under 35 U.S.C. 154(b) by 135 days.

(21) Appl. No.: 15/785,085

(22) Filed: Oct. 16, 2017

(65) Prior Publication Data

US 2018/0232597 A1    Aug. 16, 2018

(30) Foreign Application Priority Data

Feb. 16, 2017    (KR) .......................... 10-2017-0020978

(51) Int. Cl.
| | | |
|---|---|---|
| *G06K 9/46* | (2006.01) | |
| *G06K 9/20* | (2006.01) | |
| *G06K 9/62* | (2006.01) | |
| *G06K 9/68* | (2006.01) | |

(52) U.S. Cl.
CPC ......... *G06K 9/4642* (2013.01); *G06K 9/2054* (2013.01); *G06K 9/6212* (2013.01); *G06K 9/6262* (2013.01); *G06K 9/6807* (2013.01); *G06K 2209/03* (2013.01); *G06K 2209/25* (2013.01)

(58) Field of Classification Search
CPC .. G06K 9/4642; G06K 9/6262; G06K 9/6807; G06K 9/2054; G06K 9/6212; G06K 2209/25; G06K 2209/03
See application file for complete search history.

(56) References Cited

U.S. PATENT DOCUMENTS

| | | | | |
|---|---|---|---|---|
| 2011/0002507 | A1* | 1/2011 | Kuoch ................ | B60R 21/0134 382/103 |
| 2014/0015859 | A1* | 1/2014 | Kim ...................... | G06T 19/006 345/633 |
| 2015/0286885 | A1* | 10/2015 | Bulan .................. | G06K 9/4642 382/104 |
| 2017/0147890 | A1* | 5/2017 | Sano ................... | G06K 9/00805 |
| 2017/0169309 | A1* | 6/2017 | Reddy ..................... | G06F 13/28 |
| 2017/0263019 | A1* | 9/2017 | Song ........................ | G06T 11/00 |
| 2017/0277972 | A1* | 9/2017 | Moloney ............ | G06K 9/00288 |
| 2018/0039826 | A1* | 2/2018 | Kawanishi ......... | G06K 9/00201 |
| 2018/0144458 | A1* | 5/2018 | Xu ....................... | G06K 9/4676 |

* cited by examiner

*Primary Examiner* — Ming Y Hon
(74) *Attorney, Agent, or Firm* — Morgan, Lewis & Bockius LLP

(57) ABSTRACT

Disclosed are a pictogram recognition apparatus, a pictogram recognition system, and a pictogram recognition method, wherein the pictogram recognition method includes acquiring learning data, acquiring an image including a pictogram, extracting at least one zone from the image, acquiring a descriptor corresponding to the at least one zone, recognizing a pictogram by comparing the descriptor with the learning data and providing a user with information corresponding to the recognized pictogram.

17 Claims, 23 Drawing Sheets

PICTOGRAM RECOGNITION APPARATUS, PICTOGRAM RECOGNITION SYSTEM, AND PICTOGRAM RECOGNITION METHOD

CROSS-REFERENCE(S) TO RELATED APPLICATIONS

The present application claims priority to Korean Patent Application No. 10-2017-0020978, filed on Feb. 16, 2017, the entire contents of which is incorporated herein for all purposes by this reference.

BACKGROUND OF THE INVENTION

Field of the Invention

The present invention relates to a pictogram recognition apparatus, a pictogram recognition system, and a pictogram recognition method.

Description of Related Art

A pictogram may indicate images which are easily and visually displayed using at least one of symbols, letters, and figures in such a manner that a user can intuitively recognize a specific object. The pictogram has been widely used for various purposes, for example, explanation of functions, materials, or effects of a specific object, provision of information regarding a specific zone or peripheral information related to the specific zone, and a navigation service, etc.

A vehicle or a mechanical machine may include a user interface (UI) which includes an input part for inputting various commands regarding the vehicle or mechanical machine, and an output part for providing various kinds of information regarding the vehicle or construction machinery. The user interface (UI) may provide users with various kinds of information using the above-mentioned pictogram. For example, the user interface (UI) may provide users with various kinds of information using the pictogram, for example, information regarding the function or operation capable of being executed through the input part, information regarding the state or operation of a current vehicle or mechanical machine, or information regarding the peripheral situation of a vehicle or mechanical machine.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a pictogram recognition apparatus, a pictogram recognition system, and a pictogram recognition method, which can accurately recognize a pictogram and can easily and rapidly provide users with information regarding the recognized pictogram.

Additional aspects of the invention will be set forth in part in the description which follows and, in part, will be obvious from the description, or may be learned by practice of the invention.

In accordance with an aspect of the present invention, a method for recognizing a pictogram may include acquiring learning data, acquiring an image including a pictogram, extracting at least one zone from the image, acquiring a descriptor corresponding to the at least one zone, recognizing a pictogram by comparing the descriptor with the learning data, and providing a user with information corresponding to the recognized pictogram.

The extracting the at least one zone from the image may include establishing a window in the image, detecting a zone partitioned by the window, and thus extracting the at least one zone and moving the window.

The extracting the at least one zone from the image may include acquiring an image pyramid from the image and extracting at least one zone from each zone of the image pyramid.

The acquiring the descriptor corresponding to the at least one zone may include acquiring a Histogram of Oriented Gradient (HOG) regarding at least one cell constructing the at least one zone and acquiring a descriptor regarding the at least one cell using a Histogram of Oriented Gradient (HOG) regarding the at least one cell. The acquiring the descriptor corresponding to the at least one zone may further include acquiring a descriptor regarding the at least one zone by combining HOG (Histogram of Oriented Gradient) regarding at least one cell.

The recognizing the pictogram by comparing the descriptor with the learning data may include comparing the descriptor with the learning data and detecting a descriptor identical or similar to the descriptor.

The recognizing the pictogram by comparing the descriptor with the learning data may include grouping a descriptor identical or similar to the learning data from among a plurality of descriptors extracted from the at least one zone into a single group, determining whether the descriptors contained in the same group are located at different contiguous positions within the image and determining a success or failure of the pictogram recognition according to the determined result.

The acquiring the learning data may include acquiring a plurality of learning descriptors from a learning image and locating a plurality of descriptors in a hyperspace, determining a hyperplane needed for hyperspace division according to the distribution of the plurality of learning descriptors, and acquiring a plurality of division spaces according to the determined hyperplane.

The locating the plurality of descriptors in the hyperspace and the determining the hyperplane needed for hyperspace division according to the distribution of the plurality of learning descriptors may include determining a hyperplane configured to perform hyperspace division on the basis of at least one of specific information, that indicates whether the numbers of learning descriptors contained in the plurality of division spaces are identical or similar to each other, and a relative size of a ratio of a product of two standard deviations of the plurality of division spaces to a distance between average values of the respective division spaces.

The recognizing the pictogram by comparing the descriptor with the learning data may include detecting a division space having the descriptor from among the plurality of division spaces, and detecting learning data on the basis of a distance between the descriptor and a learning descriptor contained in the division space.

In accordance with an aspect of the present invention, an apparatus for recognizing a pictogram may include an image acquisition part configured to acquire an image having a pictogram, a storage device configured to store learning data, a processor configured to extract at least one zone from the image, acquire a descriptor corresponding to the at least one zone, and recognize the pictogram by comparing the descriptor with the learning data and a user interface (UI) configured to provide a user with information corresponding to the recognized pictogram.

The processor may establish a window in the image, extracts the at least one zone by detecting a zone partitioned by the window, and moves the window.

The processor may acquire an image pyramid from the image, and extracts at least one zone from each image of the image pyramid.

The processor may acquire a Histogram of Oriented Gradient (HOG) regarding at least one cell constructing the at least one zone, and acquire a descriptor regarding the at least one cell using the HOG regarding the at least one cell.

The processor may acquire a descriptor regarding the at least one zone by combining a Histogram of Oriented Gradient (HOG) regarding at least one cell.

The processor may compare the descriptor with the learning data, and detects a descriptor identical or similar to the descriptor.

The processor may group a descriptor identical or similar to the learning data from among a plurality of descriptors extracted from the at least one zone into at least one group, determine whether descriptors contained in the same group are located adjacent to each other within the image, and determine success or failure of the pictogram recognition according to the determined result.

The processor may acquire learning data by acquiring a plurality of learning descriptors from a learning image.

The processor may locate the plurality of learning descriptors in a hyperspace, determines a hyperplane needed for hyperspace division according to the distribution of a plurality of descriptors, and acquires a plurality of division spaces according to the determined hyperplane.

The processor may determine a hyperplane configured to perform hyperspace division on the basis of at least one of specific information, that indicates whether the number of learning descriptors contained in the plurality of division spaces are identical or similar to each other, and a relative size of a ratio of a product of two standard deviations of the plurality of division spaces to a distance between average values of the respective division spaces.

The processor may detect a division space having the descriptor from among the plurality of division spaces, and detects learning data on the basis of a distance between a descriptor corresponding to the at least one zone and a learning descriptor contained in the division space.

In accordance with an aspect of the present invention, a system for recognizing a pictogram may include a server apparatus and a terminal apparatus configured to communicate with the server apparatus, acquire an image having a pictogram, and provide a user with information regarding a recognized pictogram, wherein at least one of the server apparatus and the terminal apparatus performs at least one of an operation for extracting at least one zone from the image, an operation for acquiring a descriptor corresponding to the at least one zone, and an operation for performing pictogram recognition by comparing the descriptor with learning data.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A pictogram recognition apparatus, a pictogram recognition system, and a pictogram recognition method according to an exemplary embodiment of the present invention will hereinafter be described with reference to FIG. 1 and FIG. 2.

Figure 1:
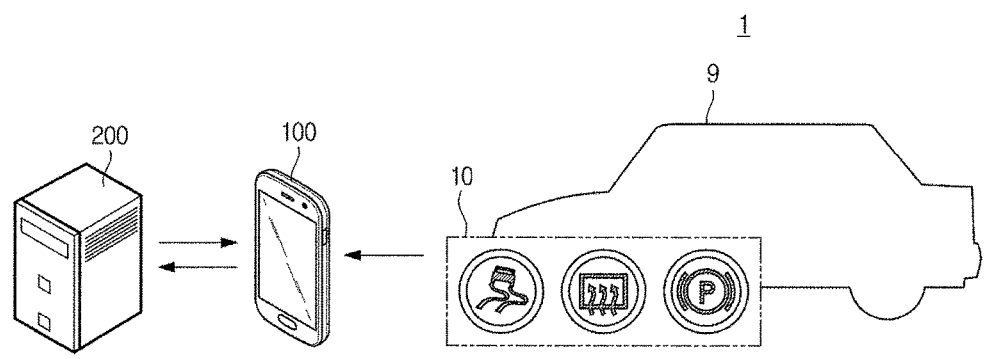
FIG. 1 is a conceptual diagram illustrating a pictogram recognition system according to an exemplary embodiment of the present invention.
Figure 2:
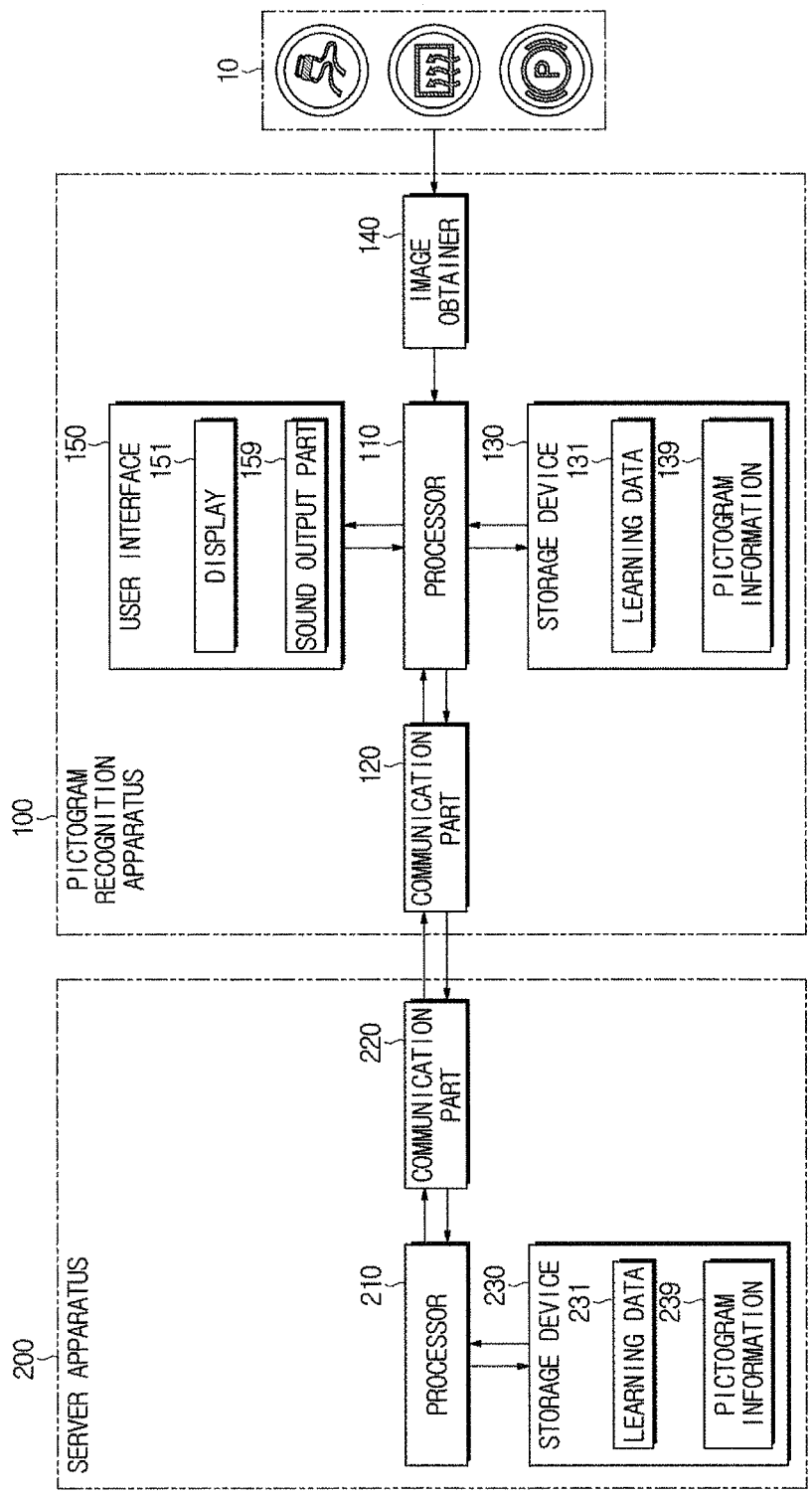
FIG. 2 is a block diagram illustrating a pictogram recognition system according to an exemplary embodiment of the present invention.

FIG. 1 is a conceptual diagram illustrating a pictogram recognition system according to an exemplary embodiment of the present invention, and FIG. 2 is a block diagram illustrating a pictogram recognition system according to an exemplary embodiment of the present invention.

Referring to FIG. 1, the pictogram recognition system 1 may include a pictogram recognition apparatus 100 which can capture and obtain images including a pictogram 10.

The pictogram 10 may refer to a picture represented using at least one of symbols, letters, and figures. For example, the pictogram 10 may be attached or printed onto various devices or signs, or may be engraved or embossed on various devices or signs. In the present case, the pictogram 10 may be attached or printed onto the surface, formed of glass or synthetic resins, or of lighting parts of various devices. In addition, the pictogram 10 may be displayed on display devices including a smartphone, a navigation device, or a television (TV) for user recognition. Besides, the pictogram 10 may be displayed on various devices or signs using various methods configured for being considered by a system designer. In more detail, the pictogram 10 may be formed on the external surfaces of various buttons of a center fascia (or center console) of the vehicle 9, or may be displayed on the instrument panel as necessary.

The pictogram 10 may be formed on some parts of the vehicle 9, for example, an instrument panel, a center fascia, a steering wheel, or a navigation device, using the above-mentioned methods.

The vehicle is a machine which travels on roads or tracks to carry people, objects or animals from place to place. Such vehicles may include, for example, a three-wheeled or four-wheeled vehicle, a two-wheeled vehicle including a motorcycle, a motorized bicycle, construction equipment, a bicycle, a train travelling on rails, and the like.

The vehicle 9 may include a general vehicle for converting thermal energy obtained by burning fossil fuels including gasoline or diesel into mechanical energy to obtain power, or may include an electric vehicle for acquiring the power needed to rotate vehicle wheels using electrical energy.

The pictogram recognition apparatus 100 may capture the pictogram 10 or capture the pictogram 10 and a peripheral region thereof to acquire image data, and may recognize the pictogram 10 from the acquired image data.

For example, the pictogram recognition apparatus 100 may include a smartphone, a cellular phone, a tablet PC, a navigation device, a desktop computer, a laptop computer, or a wearable device. Besides, any of the various devices configured for performing image capturing and image processing may be used as may be used as the pictogram recognition apparatus 100.

The pictogram 10 may be improperly recognized by general image recognition technology based on characteristic points because the pictogram 10 includes a small number of characteristic points. The characteristic points may also be properly detected only from specifically-scaled images. In addition, descriptors obtained from different pictograms may be identical to each other, wherein discrimination power for different pictograms 10 may be reduced.

Therefore, the pictogram recognition apparatus 100 may acquire a Histogram of Oriented Gradient (HOG) from a plurality of zones contained in the image to acquire descriptors, and may analyze characteristics of the descriptors distributed in space to accurately recognize the pictogram 10. A detailed descriptor thereof will hereinafter be given.

Referring to FIG. 2, the pictogram recognition apparatus 100 may include a processor 110, a storage device 130, an image acquisition part (image obtainer) 140, and a user interface (UI) 150. When necessary, the pictogram recognition apparatus 100 may further include a communication part 120.

The processor 110 may control the overall operation of the pictogram recognition apparatus 100. For example, the processor 110 may generate learning data 131 using the image acquired from the image acquisition part 140, and may store the generated learning data 131 in the storage device 130. The processor 110 may extract the pictogram 10 from the image acquired from the image acquisition part 140 or may determine information regarding the pictogram 10. In addition, the processor 110 may control the user interface (UI) 150 to provide the user with information regarding the extracted pictogram 10.

In the present case, the learning data 131 may include the acquired descriptor as described below.

The processor 110 may perform the above-mentioned operation by a pre-designed program. In the present case, the program may be stored in the storage device 130. The program may include an application program provided from a separate program provision server. The pictogram recognition apparatus 100 may directly receive the application program from the program provision server through the communication part 120, or may receive an installation program of the application program.

For example, the processor 110 may be implemented using a Central Processing Unit (CPU) or a Micro Controller Unit (MCU), or may be implemented using an electronic control unit (ECU).

The storage device 130 may be configured to temporarily or non-temporarily store various kinds of information needed to operate the processor 110.

The storage device 130 may include a main memory device and or an auxiliary memory device. The main memory device may be implemented as a semiconductor storage medium including a Random Access Memory (RAM) or Read Only Memory (ROM). For example, the ROM may include an Erasable Programmable Read-Only Memory (EPROM), an Electrically Erasable Programmable Read-Only Memory (EEPROM), a Mask ROM (MROM), etc. For example, the RAM may include a Dynamic Random Access Memory (RAM), a Static Random Access Memory (SRAM), etc. The auxiliary memory device may be implemented using a Solid State Drive (SSD) to store information using a semiconductor, may be implemented as a Hard Disc Drive (HDD) to store information using a magnetic disc, or may be implemented as various kinds of storage media, for example, a compact disc (CD), a laser disc, a magnetic tape, a magneto-optical disc, a floppy disc, etc.

In accordance with one embodiment, the storage device 130 may store learning data 131 and pictogram information 139.

The learning data 131 may refer to data pre-acquired from at least one of the pictogram recognition apparatus 100 and the server apparatus 200 to recognize the pictogram 10. The learning data 131 may be compared with data extracted from the image acquired from the image acquisition part 140.

The learning data 131 may be acquired by the processor 110 of the pictogram recognition apparatus 100, or may be acquired by the processor 210 of the server apparatus 200. Alternatively, the learning data 131 may be acquired when the processor 110 of the pictogram recognition apparatus 100 and the processor 210 of the server apparatus 200 respectively perform allocated operations. When the learning data 131 is finally acquired by the processor 210 of the server apparatus 200, the learning data 131 may be temporarily or non-temporarily stored in the storage device 130 after being transmitted from the server apparatus 200 to the pictogram recognition apparatus 100 through the communication parts 120 and 220. A detailed description of the learning data 131 will hereinafter be given.

The pictogram information 139 may include information related to the recognized pictogram 10. For example, the pictogram information 139 may include specific information indicating which operation or state is associated with the pictogram 10 including specific symbols, letters, and or figures. In more detail, the pictogram information 139 may include information indicating that a triangular pictogram 10 indicates a play button, or other information indicating that music or an image may be reproduced when a playback button is touched or pressed.

The pictogram information 139 may be implemented using at least one of symbols, letters, figures, numbers, still images (or pause images), moving images, and various kinds of information configured for being considered by other designers.

The pictogram information 139 may include plural pieces of information corresponding to respective pictograms 10.

The pictogram information 139 stored in the storage device 130 may be entered by a user, or may be additionally entered by a designer. In addition, the pictogram information 139 may also be received from the information provision server additionally provided.

When the processor 110 extracts the pictogram 10 from the image, information corresponding to the extracted pictogram 10 may be transferred to the processor 110 in response to a control command of the processor 110. The extracted information may be provided to the user through the user interface (UI) 150.

In accordance with another exemplary embodiment, the storage device 130 may not store at least one of the learning data 131 and the pictogram information 139 as necessary. In the present case, the storage device 230 of the server apparatus 200 may store at least one of the learning data 231 and the pictogram information 239. At least one of the learning data 231 and the pictogram information 239 stored in the storage device 230 may be provided to the pictogram recognition apparatus 100 through the communication parts 120 and 220.

The image acquisition part 140 may receive visible light incident from an external part, and may acquire image data by converting the received visible light into an electric signal. The acquired image data may be transferred to at least one of the processor 110 and the user interface (UI) 150.

In accordance with one embodiment, the image acquisition part 140 may acquire image data including the pictogram 10. In the present case, the image data may include not only the pictogram 10 but also other information regarding the peripheral region of the pictogram 10.

The image acquisition part 140 may capture the pictogram 10 according to user manipulation, or may capture the pictogram 10 upon receiving a control signal from the processor 110 according to predefined setting information, wherein the image acquisition part 140 may acquire image data including the pictogram 10, and may output the acquired image data.

For example, the image acquisition part 140 may capture images of a peripheral region of a moving object 1 using, for example, electromagnetic waves. In the present case, the electromagnetic waves may include visible light, infrared light, ultraviolet light, radio waves, X rays, gamma rays, microwaves, or predetermined electromagnetic waves (for example, extremely low frequency (ELF) electromagnetic waves) used to acquire information regarding the peripheral region of the moving object 1.

For example, the image acquisition part 140 may be implemented using an image capturing device including a general camera. In the present case, the imaging capturing device may acquire image data using various image pickup media including a Charge Coupled Device (CCD) or a Complementary Metal-Oxide Semiconductor (CMOS).

The user interface (UI) 150 may receive various commands or data from the user, or may visibly or audibly transmit various kinds of information to the user.

The user interface (UI) 150 may include at least one of a display 151 and a sound output part 159.

The display 151 may visibly provide various kinds of information related to the operation of the pictogram recognition apparatus 100. For example, the display 151 may display information regarding the pictogram 10 recognized by the processor 110. For example, the predefined method may include a popup window.

The display 151 may be implemented by various kinds of display panels, for example, a cathode ray tube (CRT), a liquid crystal display (LCD) panel, a light emitting diode (LED) panel, or an organic light emitting diode (OLED) panel, or the like.

The sound output part 159 may audibly provide various kinds of information related to the operation of the pictogram recognition apparatus 100. For example, the sound output part 159 may output voice or sound data indicating information regarding the pictogram 10 recognized by the processor 110, and may provide the user with the voice or sound data.

The sound output part 159 may be implemented using a predetermined speaker.

The communication part 120 may allow the pictogram recognition apparatus 100 to communicate with an external device, for example, the server apparatus 200 or the program provision server.

Through the communication part 120, the pictogram recognition apparatus 100 may receive at least one of the learning data 231 and the pictogram information 239 from the server apparatus 200, and may transmit at least one of an image acquired by the image acquisition part 140, the pictogram 10 recognized from the image, the learning data 131 acquired by the processor 110, and the pictogram information 139 stored in the storage device 130 to the server apparatus 200.

For example, the communication part 120 may be configured to communicate with the external communication part 220 using at least one of a wired communication network and a wireless communication network. Here, the wired communication network may be implemented using various cables, for example, a pair cable, a coaxial cable, an optical fiber cable, or an Ethernet cable. The wireless communication network may be implemented using at least one of short-range communication technology and long-range communication technology. The short-range communication technology may be implemented using Wi-Fi, Zig-Bee, Bluetooth, Wi-Fi Direct (WFD), Bluetooth Low Energy (BLE), Near Field Communication (NFC), or the like. The long-range communication technology may be implemented using any of various communication technologies based on various mobile communication protocols, for example, 3GPP, 3GPP2, World Interoperability for Microwave Access (WiMAX), etc.

In accordance with one embodiment, the pictogram recognition system 1 may further include the server apparatus 200 as shown in FIG. 1 and FIG. 2. The server apparatus 200 may be omitted according to designer selection.

The server apparatus 200 may include a processor 210, a communication part 220, and a storage device 230 as shown in FIG. 2.

The processor 210 may control overall operation of the server apparatus 200. When necessary, the processor 210 may perform all or some of the operation for acquiring the learning data 131 and 231, the operation for recognizing the pictogram 10, and the operation for deciding information corresponding to the pictogram 10. The processor 210 may be implemented using a central processing unit (CPU), a micro controller unit (MCU), or an electronic control unit (ECU).

The communication part 220 may allow the external devices, for example, the pictogram recognition apparatus 100 and the server apparatus 200, to communicate with each other. For example, the communication part 220 may receive at least one of the learning data 131 and the pictogram information 139 from the pictogram recognition apparatus 100, or may transmit at least one of the learning data 231 and the pictogram information 239 to the pictogram recognition apparatus 100.

The storage device 230 may temporarily or non-temporarily store various kinds of information needed to operate the processor 210 contained in the server apparatus 200. The storage device 230 may be implemented using at least one of various storage media.

In accordance with one embodiment, the storage device 230 may store at least one of the learning data 231 and the pictogram information 239. At least one of the learning data 231 and the pictogram information 239 may be acquired by the processor 110 of the pictogram recognition apparatus 100, or may be acquired by the processor 210 of the server apparatus 200.

In accordance with one embodiment, the server apparatus 200 may be implemented using a computer device provided as a server.

In accordance with another exemplary embodiment, the server apparatus 200 may also be implemented using other devices configured for performing communication and image processing. For example, the server apparatus 200 may also be implemented using the vehicle 9 in which a communication module and an electronic control unit (ECU) are provided as necessary.

An example of the pictogram recognition method will hereinafter be described with reference to FIG. 3 to FIG. 23.

Figure 3:
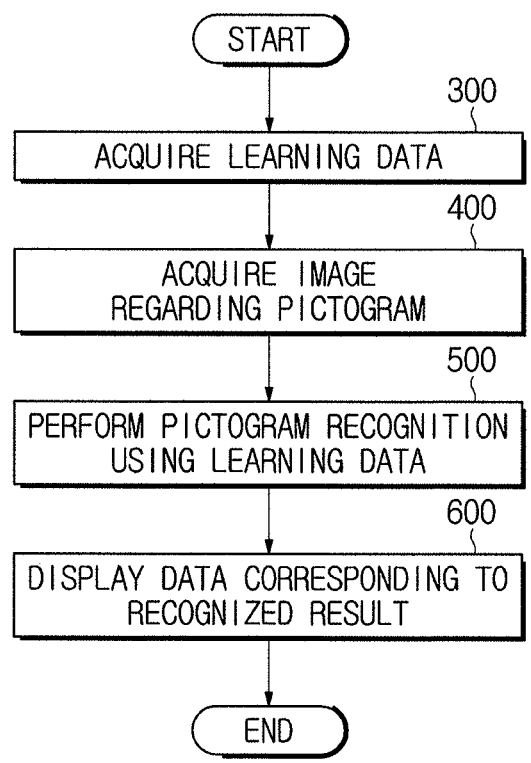
FIG. 3 is a first flowchart illustrating an example of the pictogram recognition method according to an exemplary embodiment of the present invention.

FIG. 3 is a first flowchart illustrating an example of the pictogram recognition method according to an exemplary embodiment of the present invention.

Referring to FIG. 3, the pictogram recognition method according to an exemplary embodiment of the present invention may include a process 300 for acquiring the learning data, a process 400 for acquiring an image regarding the pictogram, a process 500 for recognizing the pictogram using the learning data, and a process 600 for displaying information regarding the recognized pictogram.

The process 300 for acquiring the learning data and the process 500 for recognizing the pictogram using the learning data may be conducted by any one of the processor 110 of the pictogram recognition apparatus 100 and the processor 210 of the server apparatus 200.

In the present case, all processes of the process 300 for acquiring the learning data may be performed by any one of the processor 110 of the pictogram recognition apparatus 100 and the processor 210 of the server apparatus 200. All processes of the process 500 for recognizing the pictogram using the learning data may be performed by the other one of the processor 110 of the pictogram recognition 100 and the processor 210 of the server apparatus 200. In addition, some processes of the process 300 for acquiring the learning data or some processes of the process 500 for recognizing the pictogram using the learning data may be performed by the processor 110 of the pictogram recognition apparatus 100, and some other processes of the process 500 may be performed by the processor 210 of the server apparatus 200 as necessary.

For example, the process 400 for acquiring the image regarding the pictogram may be performed by the image acquisition part 140 of the pictogram recognition apparatus 100.

The process 600 for displaying information corresponding to the recognized pictogram may be performed by the user interface (UI) 150 upon receiving a control signal from the processor 110 of the pictogram recognition apparatus 100.

The above-mentioned processes 300 to 600 will hereinafter be described.

In the process 300 for acquiring the learning data, the learning data 131 used to extract the pictogram 10 from the acquired image may be obtained.

Figure 4:
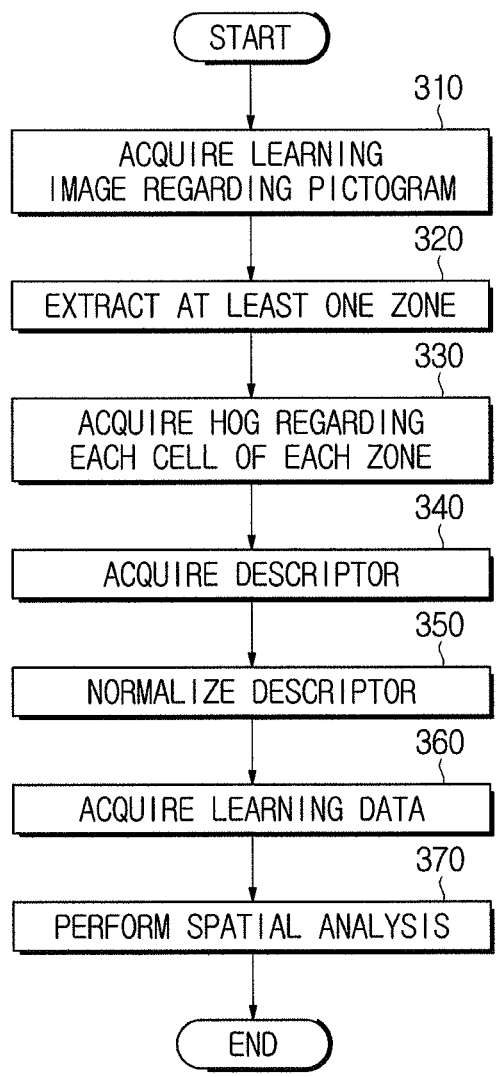
FIG. 4 is a second flowchart illustrating an example of the pictogram recognition method.
Figure 5:
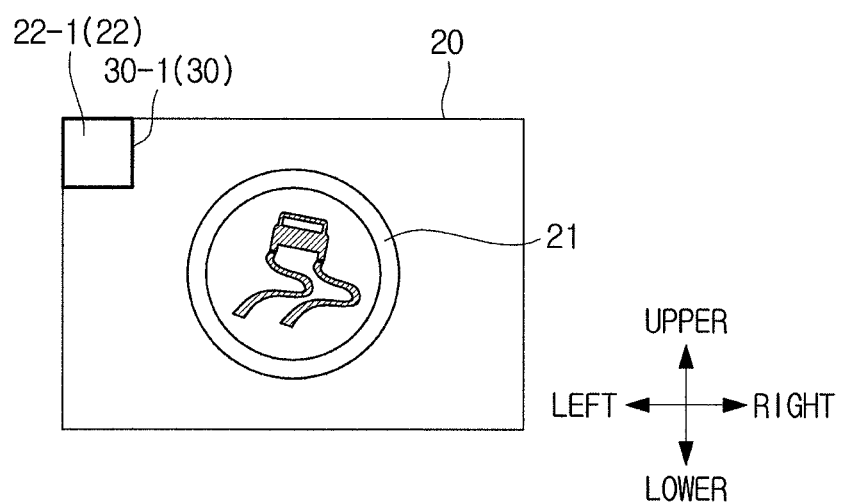
FIG. 5 is a conceptual diagram illustrating movement of a window.

FIG. 4 is a second flowchart illustrating an example of the pictogram recognition method, and FIG. 5 is a conceptual diagram illustrating movement of a window. In FIG. 5, the direction of the drawing will hereinafter be defined as the direction of a learning image 20.

Referring to FIG. 4 and FIG. 5, at least one learning image 20 is first acquired to acquire the learning data (310). Each of at least one learning image 20 may include at least one pictogram 21, and the pictograms 21 of one or more learning images 20 may be different from each other.

The learning image 20 may be performed by the image acquisition part 140 of the pictogram recognition apparatus 100, or may be performed by another device separately provided in the pictogram recognition apparatus 100. The separate device may include a computer configured for acquiring the learning image 20, a camera, or a mobile terminal including a smartphone.

When necessary, when the learning image 20 is acquired, several images may be further acquired from the learning image 20. For example, an image pyramid regarding the learning image 20 may be further acquired. The image pyramid may include a plurality of images different in scale from the learning image 20. The image pyramid will hereinafter be described in detail.

Figure 6:
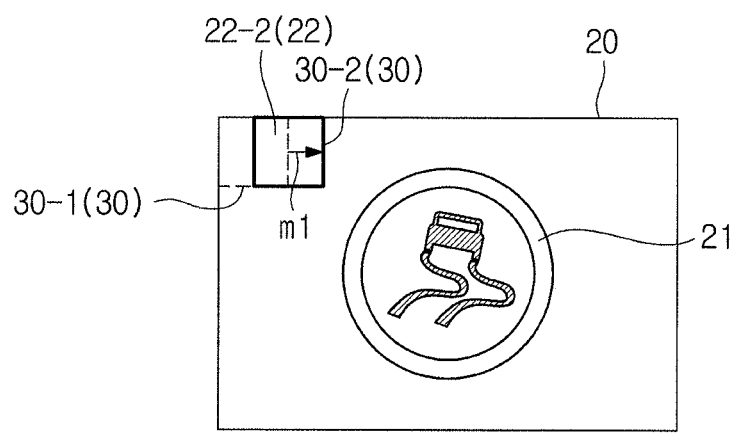
FIG. 6 is a second drawing illustrating movement of the window.
Figure 7:
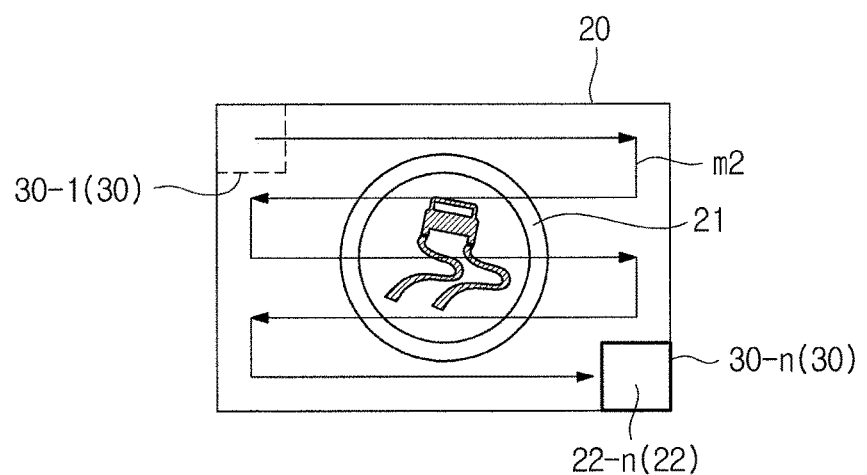
FIG. 7 is a third drawing illustrating movement of the window.

FIG. 6 is a second drawing illustrating movement of the window, and FIG. 7 is a third drawing illustrating movement of the window.

When the learning image 20 is acquired, at least one zone may be extracted from the learning image 20 (320). The extraction process 320 of at least one zone may be performed by defining a plurality of windows 30 (30-1, 30-2, . . . , 30-N) at different positions.

In accordance with one embodiment, the extraction process 320 of at least one zone may be conducted according to a sliding window scheme.

In accordance with the sliding window scheme, as shown in FIG. 5 to FIG. 7, at least one window 30 may be defined to overlap with the learning image 20, and at least one zone 22 may be defined according to a partition of at least one window 30.

In more detail, as shown in FIG. 5, the window 30-1 may be defined as some parts (for example, a left upper boundary) of the learning image 20, and a zone 22-1 contained in the defined window 30-1 may be defined for an image recognition.

Subsequently, as shown in FIG. 6, the window 30-2 may be shifted to a predetermined direction (e.g., the right direction m1), and the zone 22-2 corresponding to the shifted position may be defined for an image recognition. The movement distance of the window 30-1 may be determined at random according to designer selection. For example, the window 30-2 may be shifted such that most zones 22-2 partitioned by the shifted window 30-2 can overlap with the zone 22-1 partitioned by a previous window 30-1 acting as a pre-movement window. Alternatively, the window 30-1 may also be shifted such that the zone 22-2 partitioned by the shifted window 30-2 does not overlap with the zone 22-1 partitioned by the pre-movement window 30-1.

The windows 30 (30-1, 30-2, . . . , 30-N) may be sequentially shifted, wherein several zones 22 (22-1, 22-2, . . . , 22-N) contained in the learning image 20 can be defined. As shown in FIG. 7, the window 30-N may be continuously shifted until reaching a predefined destination (e.g., a right lower boundary of the learning image 20).

Movement of the window 30 may be achieved in a zigzag pattern as shown in FIG. 7. That is, the window 30 may move from a left upper boundary to the right direction, may move from a right upper boundary to a lower direction, may move to the right direction, may move from a left boundary to the lower direction, and may move again to the right direction, wherein the window 30 can move to the destination by repeating the above-mentioned movement actions.

In accordance with another exemplary embodiment, the window 30 may move to the right direction in the range from the left boundary to the right boundary, and may move to the right direction in the range from the boundary located just below the left boundary to the other boundary located just below the right boundary, wherein the window 30 can move to the destination by repeating the above-mentioned movement actions.

Besides, the window 30 may be movable in various ways configured for being considered by the designer.

When several zones 22 (22-1, 22-2, . . . , 22-N) are obtained by the windows 30 (30-1, 30-2, . . . , 30-N), a Histogram of Oriented Gradient (HOG) for each zone 22 (22-1, 22-2, . . . , 22-N) may be acquired (330), wherein the descriptor can be acquired (340).

When any one zone 22 (22-1, 22-2, . . . , 22-N) is defined, the HOG acquisition process 330 and the descriptor acquisition process 340 may be performed as soon as any one zone 22 (22-1, 22-2, . . . , 22-N) is defined, or may be performed after lapse of a predetermined time after definition of any one zone 22 (22-1, 22-2, . . . , 22-N). Alternatively, the HOG acquisition process 330 and the descriptor acquisition process 340 may also be performed after definition of all zones 22 (22-1, 22-2, . . . , 22-N).

Figure 8:
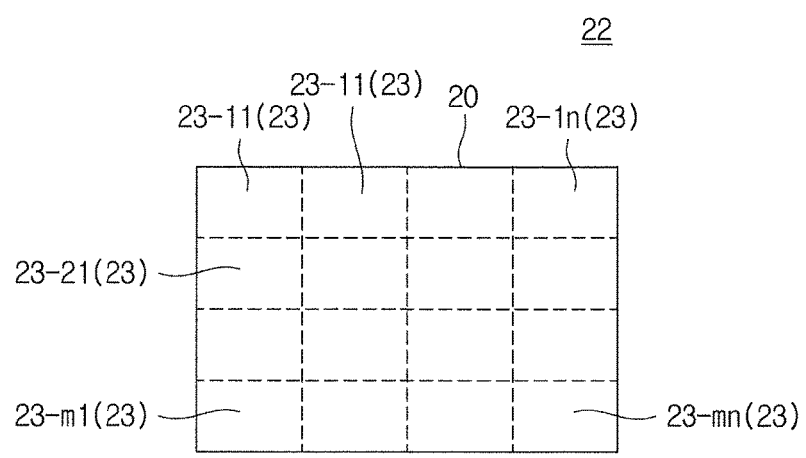
FIG. 8 is a view illustrating one zone divided into a plurality of cells.
Figure 9:
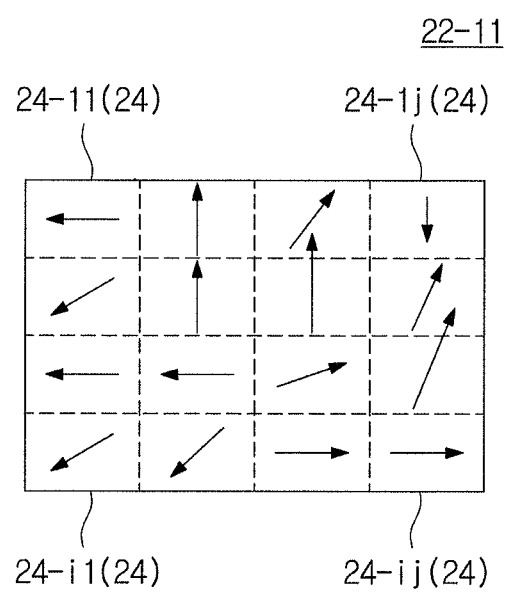
FIG. 9 is a view illustrating a gradient of each cell.
Figure 10:
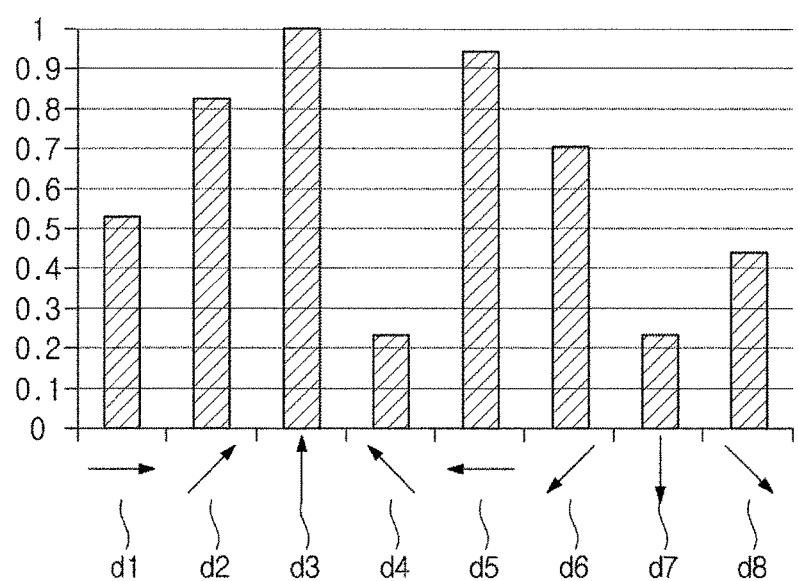
FIG. 10 is a first drawing illustrating an example of the HOG corresponding to each cell.
Figure 11:
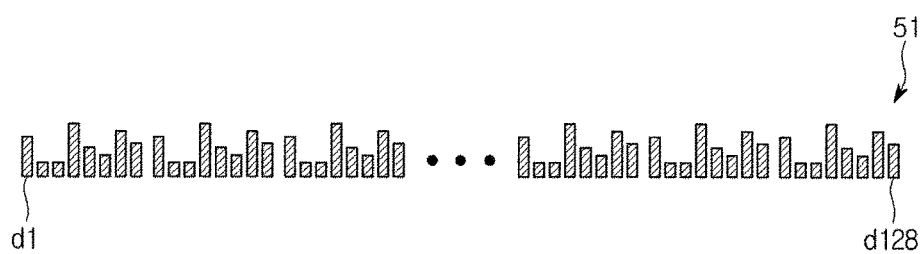
FIG. 11 is a view illustrating an example of the HOG within one zone.

FIG. 8 is a view illustrating one zone divided into a plurality of cells, and FIG. 9 is a view illustrating a gradient of each cell. FIG. 10 is a first drawing illustrating an example of the HOG corresponding to each cell, and FIG. 11 is a view illustrating an example of the HOG within one zone. In FIG. 10 and FIG. 11, an X-axis may refer to a directional (or orientation) component of an image gradient, and a Y-axis may refer to a value corresponding to a directional component of the image gradient.

Referring to FIG. 8, the zone 22 defined by the window 30 may include a plurality of cells 23 (23-11, 23-12, . . . , 23-1n, . . . , 23-21, . . . , 23-m1, . . . , 23-mn) defined by dividing the zone 22 into a plurality of smaller zones.

For example, the plurality of cells 23 (23-11, 23-12, . . . , 23-1n, . . . , 23-21, . . . , 23-m1, . . . , 23-mn) may be configured in a matrix shape (e.g., (m×n) matrix, where "m" or "n" is a natural number higher than "0"). In the present case, "m" and "n" may be identical to each other or may be different from each other. In accordance with one embodiment, "m" or "n" may be set to 4. In other words, the zone 22 defined by the window 30 may include a plurality of cells 23 (23-11, 23-12, . . . , 23-1n, . . . , 23-21, . . . , 23-m1, . . . , 23-mn) arranged in a (4×4) matrix shape.

Each of the cells 23 (23-11, 23-12, . . . , 23-1n, . . . , 23-21, . . . , 23-m1, . . . , 23-mn) may include at least one pixel 24 (24-11, . . . , 24-1j, . . . , 24-i1, . . . , 24-ij) as shown in FIG. 9. The pixels 24 (24-11, . . . , 24-1j, . . . , 24-i1, . . . , 24-ij) may refer to a minimum unit configured to form the image. The pixels 24 (24-11, . . . , 24-1j, . . . , 24-i1, . . . , 24-ij) may be configured in an (i×j) matrix shape (where "i" or "j" is a natural number higher than "0"). In the present case, "i" and "j" may be identical to each other, or may be different from each other. In accordance with one embodiment, for example, "i" may be set to 4, and "j" may be set to 4. In other words, the plurality of cells 23 (23-11, 23-12, . . . , 23-1n, . . . , 23-21, . . . , 23-m1, . . . , 23-mn) may include the plurality of pixels 24 (24-11, . . . , 24-1j, . . . , 24-i1, . . . , 24-ij) arranged in a (4×4) matrix shape.

Image data may be present in each pixel 24 (24-11, . . . , 24-1j, . . . , 24-i1, . . . , 24-ij), and image data of each pixel 24 (24-11, . . . , 24-1j, . . . , 24-i1, . . . , 24-ij) may include an image gradient as shown in FIG. 9.

The image gradient may refer to a directional (or orientation) variation of brightness or color contained in the image, and may be represented by a vector component. The image gradient may include the directional variation of brightness or color contained in each pixel 24 (24-11, . . . , 24-1j, . . . , 24-i1, . . . , 24-ij).

Image gradients acquired from the respective pixels 24 (24-11, . . . , 24-1j, . . . , 24-i1, . . . , 24-ij) may be different from each other, or may be identical to each other. In addition, the image gradients of some pixels from among the plurality of pixels 24 (24-11, . . . , 24-1j, . . . , 24-i1, . . . , 24-ij) may be identical to each other, or an image gradients of some other pixels may be different from the above image gradients of some pixels.

In accordance with one embodiment, the image gradients may be defined in 8 ways as shown in FIG. 10. For example, the image gradients may include a right-directional component d1, a right-upper-directional component d2, an upper-directional component d3, a left-upper-directional component d4, a left-directional component d5, a left-lower-directional component d6, a lower-directional component d7, and a right-lower-directional component d8.

At least one (hereinafter referred to as the processors 110 and 210) of the processor 110 of the pictogram recognition apparatus and the other processor 210 of the server apparatus 200 may acquire the image gradient of each pixel 24 (24-11, . . . , 24-1*j*, . . . , 24-*i*1, . . . , 24-*ij*) configured to form any one cell 23 (23-11, 23-12, . . . , 23-1*n*, . . . , 23-21, . . . , 23-*m*1, . . . , 23-*mn*), and at least one descriptor regarding a specific cell 23 (23-11, 23-12, . . . , 23-1*n*, . . . , 23-21, . . . , 23-*m*1, . . . , 23-*mn*) may be acquired using the acquired image gradient.

In accordance with one embodiment, as shown in FIG. 10, the processors 110 and 210 may acquire the HOG 50 corresponding to any one cell 23 (23-11, 23-12, . . . , 23-1*n*, . . . , 23-21, . . . , 23-*m*1, . . . , 23-*mn*), and may thus acquire at least one descriptor corresponding to any one cell 23 (23-11, 23-12, . . . , 23-1*n*, . . . , 23-21, . . . , 23-*m*1, . . . , 23-*mn*).

The HOG 50 may include not only the respective directional components d1-d8 of the image gradients acquired from the respective pixels 24 (24-11, . . . , 24-*ij*, . . . , 24-*i*1, . . . , 24-*ij*), but also a plurality of values corresponding to the respective directional components d1~d8. For example, as shown in FIG. 10, the HOG 50 may include 8 directional components (d1, d2, d3, d4, d5, d6, d7, d8) and a plurality of values respectively corresponding to the 8 directional components d1~d8.

The processors 110 and 210 may accumulate the image gradients of the respective pixels 24 (24-11, . . . , 24-1*j*, . . . , 24-*i*1, . . . , 24-*ij*) of any one selected cell 23 (23-11, 23-12, . . . , 23-1*n*, . . . , 23-21, . . . , 23-*m*1, . . . , 23-*mn*), and may thus generate the HOG 50 for any one cell 23 (23-11, 23-12, . . . , 23-1*n*, . . . , 23-21, . . . , 23-*m*1, . . . , 23-*mn*). In the present case, the values corresponding to the respective components d1~d8 of the HOG 50 may be defined in response to a frequency or size of the image gradient detected from any one cell 23 (23-11, 23-12, . . . , 23-1*n*, . . . , 23-21, . . . , 23-*m*1, . . . , 23-*mn*). For example, the values allocated to the respective components d1-d8 of the HOG 50 may be defined in proportion to the frequency or size of the image gradient.

For example, from among the plurality of image gradients detected from any one cell 23 (23-11, 23-12, . . . , 23-1*n*, . . . , 23-21, . . . , 23-*m*1, . . . , 23-*mn*), a relatively high value may be allocated to and recorded in the directional component (e.g., the upper-directional component d3) corresponding to the image gradient being detected at a relatively high frequency, and a relatively low value may be allocated to and recorded in the direction (e.g., a left-upper-directional component d4 or a lower-directional component d7) corresponding to the image gradient being detected at a relatively low frequency. In the present case, as described above, the values recorded in the respective directions d3, d4, and d7 may be proportional to the detected frequency.

From among the recording directions of a relatively high value (i.e., from among the plurality of image gradients), the direction corresponding to a relatively-additionally-detected image gradient may be defined as a representative direction of any one cell 23. For example, as shown in FIG. 10, the upper direction d3 may be defined as a representative direction of any one cell 23.

The processors 110 and 210 may acquire the HOG 50 corresponding to each cell 23 (23: 23-11, 23-12, . . . , 23-1*n*, . . . , 23-21, . . . , 23-*m*1, . . . , 23-*mn*) constructing any one zone 22, and may acquire the HOG 51 of any one zone 22 by combining the acquired HOG 50, as shown in FIG. 11.

Assuming that each zone 22 includes the cell 23 formed in a (4×4) matrix shape and 8 directional components are established, the HOG 51 of one zone 22 may include a total of 128 components (=(4×4) cells×8 directional components) d1~d128.

Referring to FIG. 10 and FIG. 11, when the HOGs 50 and 51 are acquired, each directional component of the HOGs 50 and 51 may be determined to be a descriptor.

Therefore, assuming that a total of 8 directional components are defined in the same manner as described above, 8 descriptors may be acquired from any one cell 23 (23-11, 23-12, . . . , 23-1*n*, . . . , 23-21, . . . , 23-*m*1, . . . , 23-*mn*). In addition, assuming that 8 directional components are defined and any one zone 22 includes the cell 23 formed in a (4×4) matrix shape, 128 descriptors for any one zone 22 may be acquired.

As described above, the acquired descriptor may be defined as the learning data 131 and 231, and may be stored in the storage devices 130 and 230 (360).

Referring to FIG. 4, when the descriptor is acquired, the processors 110 and 210 may normalize the descriptor for each acquired cell 23 (350).

For example, the HOGs 50 and 51 acquired as described above are normalized so that the descriptor can be normalized.

For example, the processors 110 and 210 may determine the ratio of a value corresponding to a representative direction (e.g., the upper direction d3 of FIG. 10) to values corresponding to other directions (d1, d2, and d4 to d8), may define a value corresponding to the representative direction as the value of 1, may proportionally reduce the values corresponding to the other directions (d1, d2, and d4 to d8) on the basis of the determined ratio, herein the normalized HOG can be acquired as shown in FIG. 10.

In addition, the processors 110 and 210 may perform registration of the HOGs 50 and 51 on the basis of the representative direction of any one cell 23, and may normalize the HOGs 50 and 51 on the basis of the representative direction.

As described above, assuming that the HOGs 50 and 51 for the respective cells 23 (23-11, 23-12, . . . , 23-1*n*, . . . , 23-21, . . . , 23-*m*1, . . . , 23-*mn*) are acquired, the image gradient acquired from the respective cells 23 (23-11, 23-12, . . . , 23-1*n*, . . . , 23-21, . . . , 23-*m*1, . . . , 23-*mn*) may be affected by external noise, for example, errors of the image capturing device or variation of external lighting. The above-mentioned affection may cause unexpected errors to the acquired HOGs 50 and 51. Normalization of the HOGs 50 and 51 may reduce such errors.

The normalization process 350 of the HOGs 50 and 51 may be omitted according to random selection of the designer.

The normalized descriptor may be defined as the learning data 131 and 231, and may be stored in the storage devices 130 and 230 (360).

Figure 12:
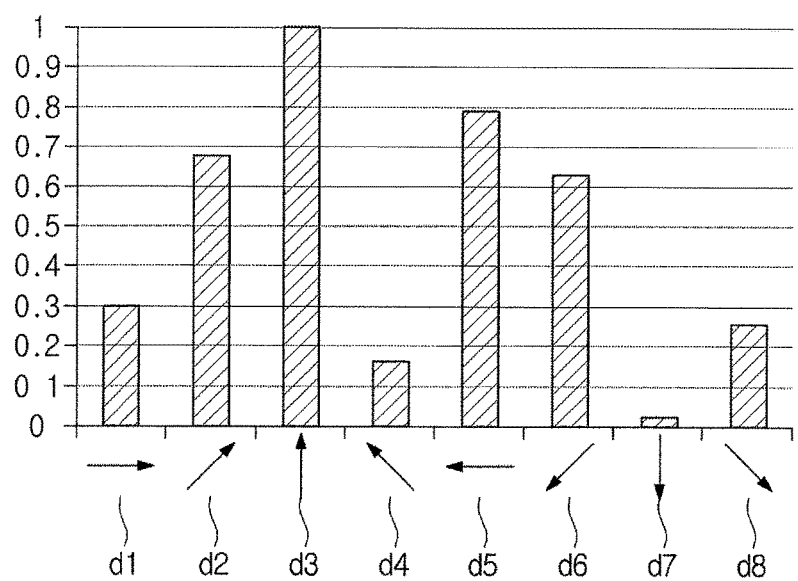
FIG. 12 is a second drawing illustrating an example of the HOG corresponding to each cell.

FIG. 12 is a second drawing illustrating an example of the HOG corresponding to each cell. In FIG. 12, an X-axis may refer to a directional (or orientation) component of an image gradient, and a Y-axis may refer to a value corresponding to a directional component of the image gradient.

The pictogram 10 may be implemented as a smaller number of colors to improve visibility. For example, the pictogram 10 may be implemented with two colors.

In accordance with one embodiment, the processors 110 and 210 may acquire the HOGs 50 and 51 using binary characteristics of the pictogram 10, wherein the above-mentioned external noise may also be minimized.

In more detail, the processors 110 and 210 may perform image binarization for the first acquired learning image 20, and may perform the same processing on the basis of the binarized learning image, wherein the HOG 52 can be acquired as shown in FIG. 12.

The HOG 52 acquired using the binarized learning image may use the learning image 20 without change, wherein the value corresponding to the representative direction (e.g., the upper direction d3 of FIG. 12) is relatively strengthened as compared to the HOGs 50 and 51, resulting in acquisition of the HOG 52. Therefore, the representative direction acquired from the HOG 52 can be more relatively robust against the external noise, and a suitable representative direction can be extracted from the HOG 52.

The HOG 52 acquired using the binarized learning image may also be normalized as described above. The value corresponding to the representative direction of the HOG 52 may be relatively higher than the value corresponding to the representative direction of the HOGs 50 and 51 acquired using the learning image 20, wherein a difference between the value corresponding to the representative direction and the other value corresponding to another direction may be more relatively increased. Therefore, as can be seen from the HOG 52 that is acquired and normalized using the binarized learning image, a difference between the respective directional components may appear more clearly.

Figure 13:
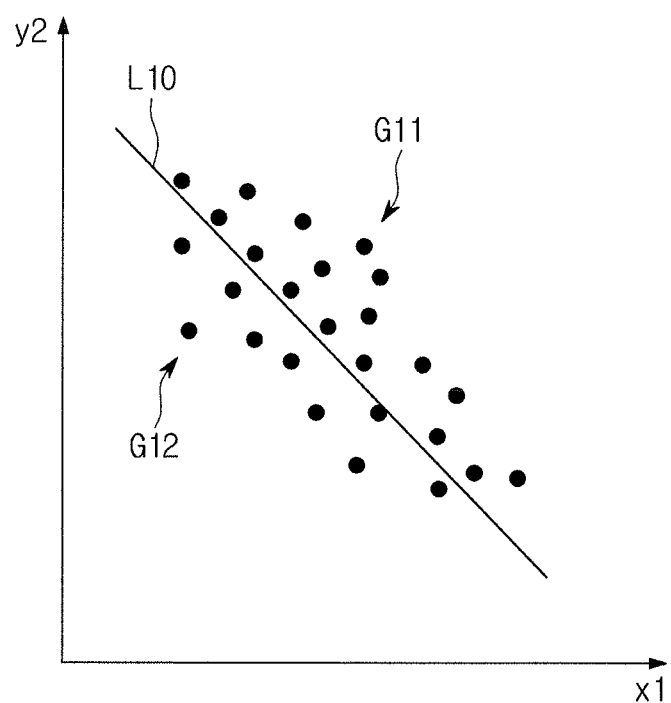
FIG. 13 is a view illustrating a first example for dividing hyperspace into a plurality of hyperplanes.
Figure 14:
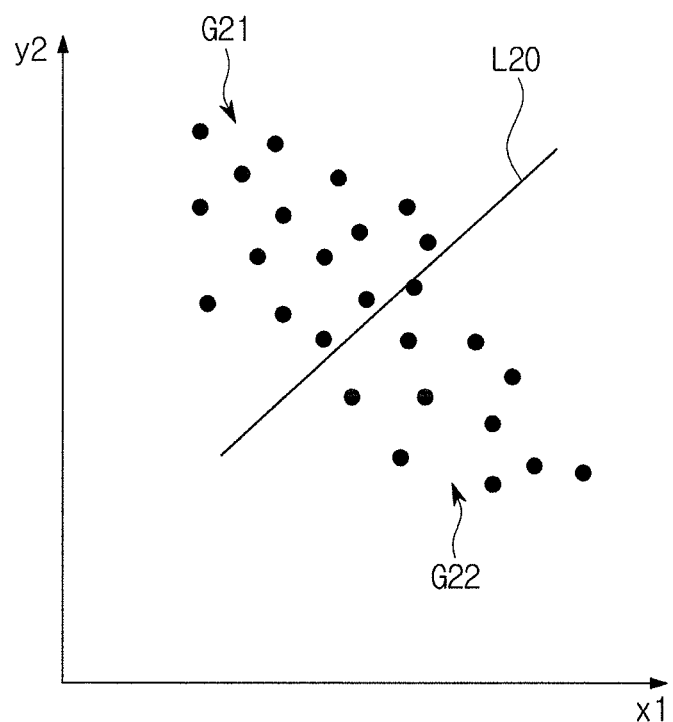
FIG. 14 is a view illustrating a second example for dividing hyperspace into a plurality of hyperplanes.
Figure 15:
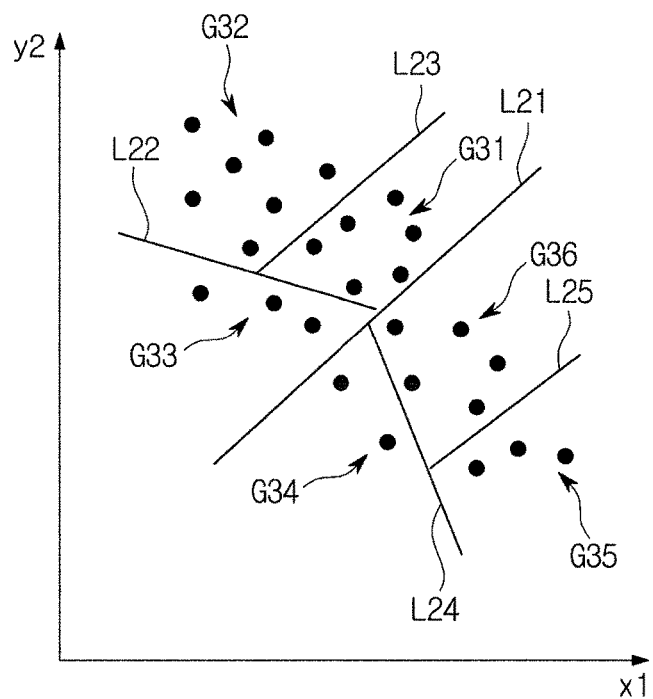
FIG. 15 is a view illustrating a third example for dividing hyperspace into a plurality of hyperplanes.

FIG. 13 is a view illustrating a first example for dividing hyperspace into a plurality of hyperplanes, and FIG. 14 is a view illustrating a second example for dividing hyperspace into a plurality of hyperplanes. FIG. 15 is a view illustrating a third example for dividing hyperspace into a plurality of hyperplanes. FIG. 13 to FIG. 15 are conceptual diagrams illustrating distribution of two-dimensional (2D) data for convenience of descriptor. In FIG. 13 to FIG. 15, assuming that data is represented by a 2D vector, an X-axis and a Y-axis may respectively indicate vector values of the 2D vector. In FIG. 13 to FIG. 15, each dot may refer to the descriptor.

In accordance with one embodiment, when the descriptor is acquired (340) or after the descriptor is normalized (350), the processors 110 and 210 may perform spatial analysis (370).

Assuming that the pictogram 10 is recognized by comparing the descriptor acquired from the pictogram recognition process 500 with all the descriptors acquired from the process 300, a long time period may be unavoidably consumed to recognize the pictogram 10, wherein it may be impossible to recognize the pictogram 10 in real time.

The processors 110 and 210 may further perform spatial analysis to reduce the recognition time of the pictogram 10.

The processors 110 and 210 may control the acquired descriptors to be located at hyperspace of the corresponding multiple dimensions, and may define at least one hyperplane configured to perform hyperspace division according to the distribution characteristics of the plurality of descriptors as shown in FIG. 13 to FIG. 15, wherein the space division process can be performed.

For example, assuming that 128 descriptors for a single zone 22 are defined, 128 descriptors are arranged in 128 dimensional (128D) hyperspace, and information indicating an arrangement method of the 128 descriptors is confirmed, wherein at least one hyperplane can be determined.

In accordance with one embodiment, the processors 110 and 210 may determine the hyperplane configured for dividing the hyperspace to prevent misrecognition from occurring in the recognition process 500 of the pictogram 10.

For example, assuming that several descriptors are distributed in the hyperspace as shown in FIG. 13, when one space is divided into two spaces G11 and G12 using a first line L10, the distribution direction of several descriptors is similar to the first line L10, wherein the descriptor having existed in the first space GI during the learning process 300 may be misrecognized to exist in the second space G12 during the recognition process 500 due to noise generated in the image acquisition part 140.

On the other hand, as shown in FIG. 14, assuming that one space is divided into two spaces G21 and G22 using the second line L20, the distribution direction of several descriptors and the first line L20 may not be similar to each other, and may be almost orthogonal to each other as necessary, resulting in reduction of a probability of misrecognizing the pictogram 10.

Therefore, the processors 110 and 210 may define and establish a hyperplane according to the distribution characteristics of several descriptors, wherein reduction of the recognition rate based on noise generated from the image acquisition part 140 can be minimized, and may define several division spaces G21 and G22 acquired by hyperspace division.

In more detail, the processors 110 and 210 may be designed to define or establish the hyperplane according to whether at least one of the following three conditions is satisfied:

First Condition: When the hyperplane is defined, a smaller number of data pieces configured for being located at the other region are needed.

Second Condition: The numbers of descriptors contained in the respective spaces G21 and G22 divided by the hyperplane may be identical to each other or may be similar to each other.

Third Condition: The ratio of the product of two standard deviations of the respective spaces G21 and G22 to the distance between average values of the respective spaces G21 and G22 may be relatively high. That is, the above-mentioned ratio may satisfy the following equation 1:

$$\text{(Distance between average values of two spaces)} / \text{(Product of standard deviations of two spaces)} > C_{ref} \qquad \text{[Equation 1]}$$

In Equation 1, an average value of the spaces G21 and G22 may refer to an average value of the descriptors belonging to the respective spaces G21 and G22, and a standard deviation of the spaces G21 and G22 may be determined to be a standard deviation of the descriptors belonging to the respective spaces G21 and G22. $C_{ref}$ may refer to a threshold value, and may be arbitrarily defined by the designer.

When the processors 110 and 210 perform space division using the above-mentioned first to third conditions, the hyperspace can be properly divided, wherein the probability of misrecognizing the pictogram 10 in the recognition process 500 is relatively reduced.

Referring to FIG. 14, assuming that the hyperspace is divided into several spaces G21 and G22, the processors 110 and 210 defines an additional hyperplane for at least one of the spaces G21 and G22, wherein at least one of the spaces G21 and G22 can be further divided.

As described above, the division process may be continuously and repeatedly performed. Therefore, as shown in FIG. 15, the hyperspace may be divided into a plurality of spaces G31, G32, G33, G34, G35, and G36. The spaces G31, G32, G33, G34, G35, and G36 may be acquired after being divided by a plurality of segments (i.e., hyperplanes L21, L22, L23, and L24). The hyperspace may have a tree structure according to a repetition of the division process.

In accordance with one embodiment, the division process may be repeated until the number of descriptor contained in at least one space from among the spaces G31, G32, G33, G34, G35, and G36 is less than a predefined value, or may also be repeated until the number of descriptors contained in each space G31, G32, G33, G34, G35, or G36 is less than a predefined value.

The hyperplanes L20, L21, L22, L23, and L24 used for hyperspace division may be stored in at least one of the storage device 130 of the pictogram recognition apparatus 100 and the storage device 230 of the server apparatus 200. When the pictogram 10 is recognized, the hyperplanes L20, L21, L22, L23, and L24 may be called by the processors 110 and 210 and then used.

According to the space analysis process 370, a dimension of each descriptor may be relatively lowered. For example, the dimension of the 128D descriptor may be less than 128.

In accordance with one embodiment, the processors 110 and 210 may also perform the space division process using a Support Vector Machine (SVM). In the case of using the SVM, the acquisition process 300 of the learning data is performed at a relatively slow speed. When the pictogram to be learned is added, all the descriptors may be re-learned, and a large number of learning data pieces may be needed.

The space analysis process 370 may be omitted as necessary. After acquisition of the learning data 131 and 231 as described above, the pictogram recognition apparatus 100 may acquire image data including the pictogram 10 according to user manipulation or a predefined setting as shown in FIG. 3 (400).

When image data including the pictogram 10 is acquired, various processes of image data are conducted to recognize the pictogram 10, and recognition of the pictogram 10 may be conducted using the image processing result and the acquired learning data (500).

Figure 16:
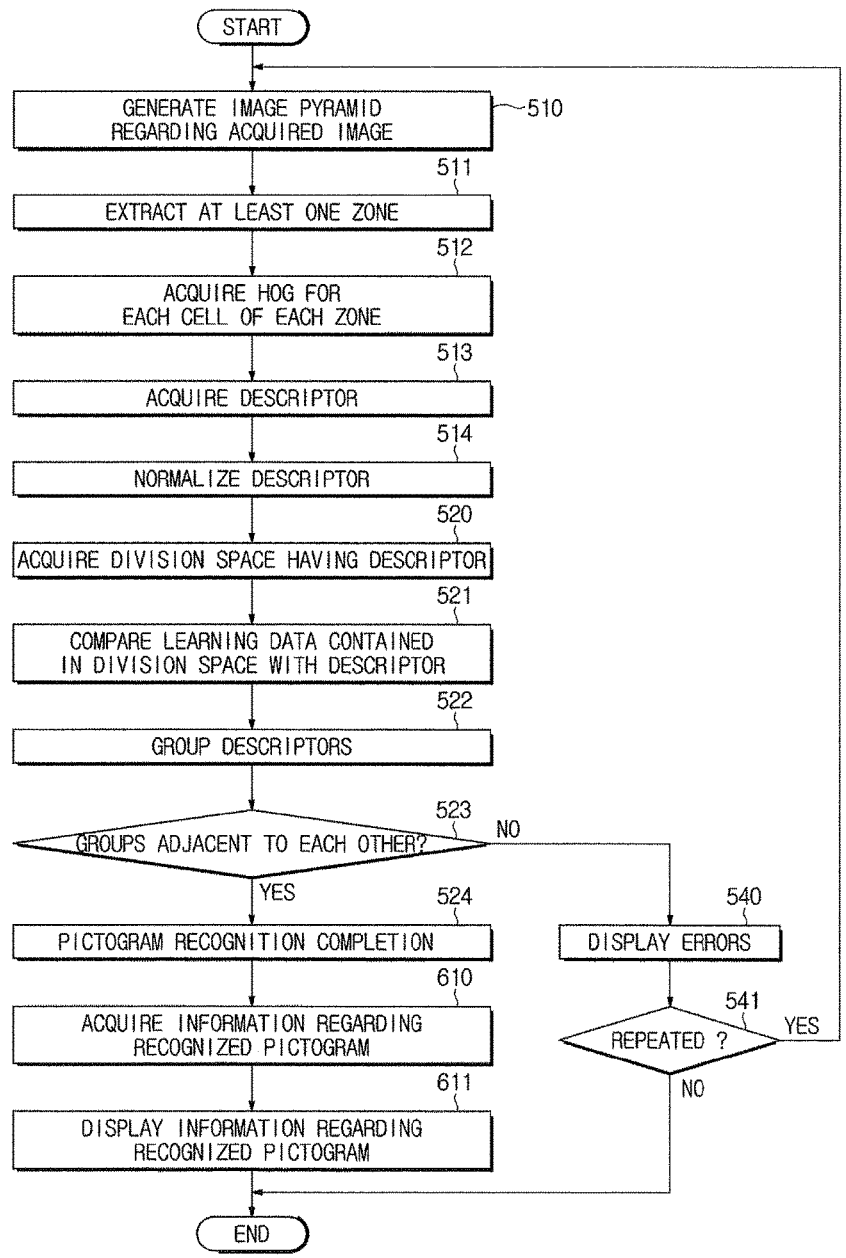
FIG. 16 is a second flowchart illustrating an example of the pictogram recognition method.
Figure 17:
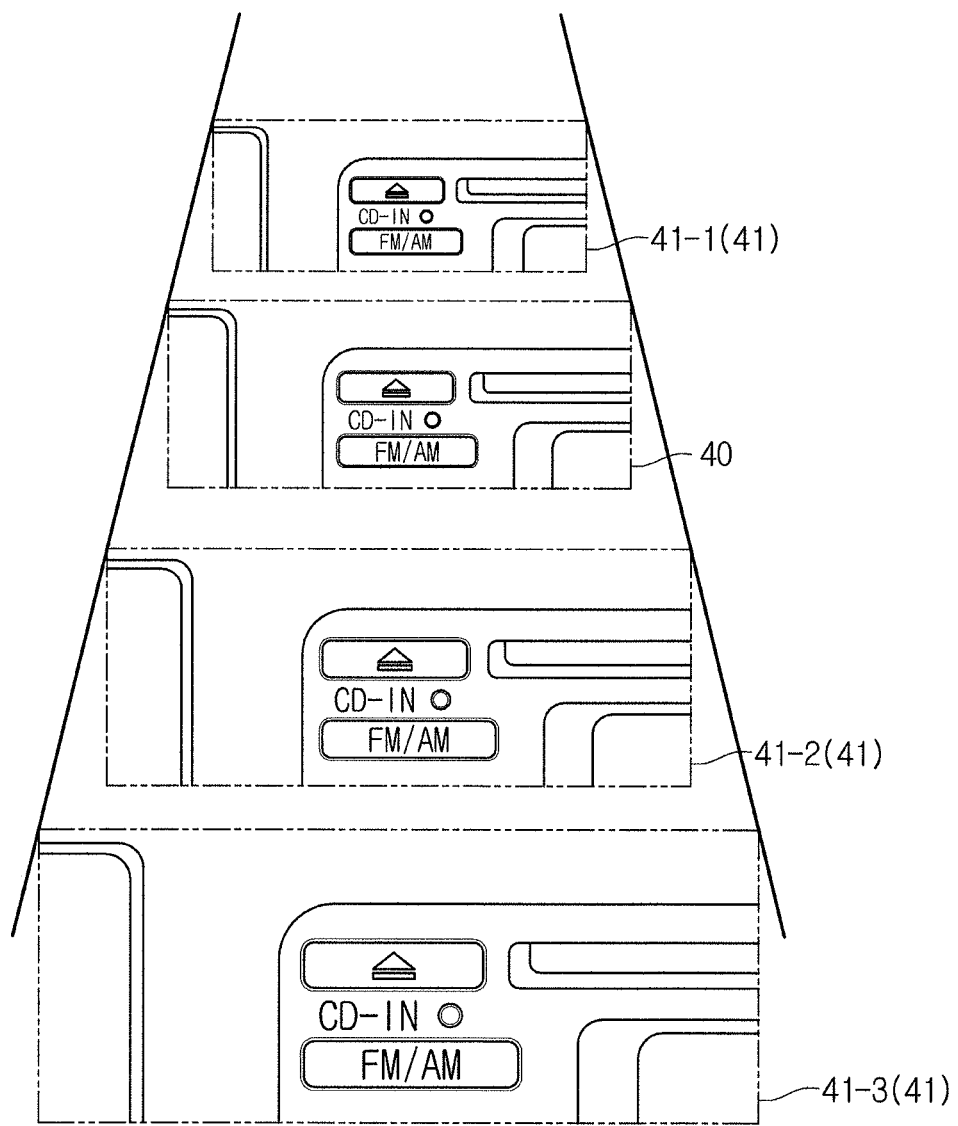
FIG. 17 is a view illustrating an example of the image pyramid.

FIG. 16 is a second flowchart illustrating an example of the pictogram recognition method, and FIG. 17 is a view illustrating an example of the image pyramid.

Referring to FIG. 4, when the pictogram recognition method starts operation, the image acquisition part 140 may acquire image data including the pictogram 10 according to user manipulation or a predefined setting (400).

Referring to FIG. 16, the processors 110 and 210 may generate the image pyramid of the acquired image in response to acquisition of the image data (510).

Referring to FIG. 17, the image pyramid may refer to at least one image 41 (41-1, 41-2, 41-3) acquired by changing a scale of a single reference image 40. In other words, according to the result of creating the image pyramid, a single image 40 and at least one image 41 (41-1, 41-2, 41-3) different in scale from the single image 40 can be acquired.

The processors 110 and 210 may extract at least one zone for each of the plurality of images 40 (41-1, 41-2, 41-3) (511). In the present case, at least one zone may be sequentially extracted from the plurality of images 40 (41-1, 41-2, 41-3). Alternatively, at least one zone may be simultaneously extracted from the plurality of images 40 (41-1, 41-2, 41-3), and at least one zone may also be alternately extracted from the plurality of images 40 (41-1, 41-2, 41-3).

As described above, the processors 110 and 210 may extract at least one zone from the plurality of images 40 (41-1, 41-2, 41-3) using the sliding window scheme.

Figure 18:
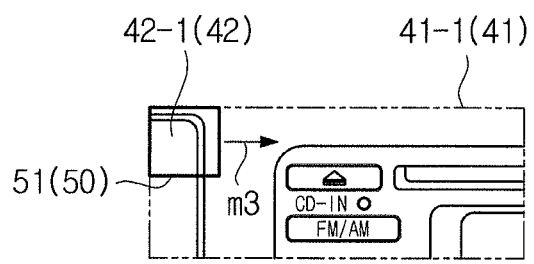
FIG. 18 is a conceptual diagram illustrating an example of movement of the window on a first image.
Figure 19:
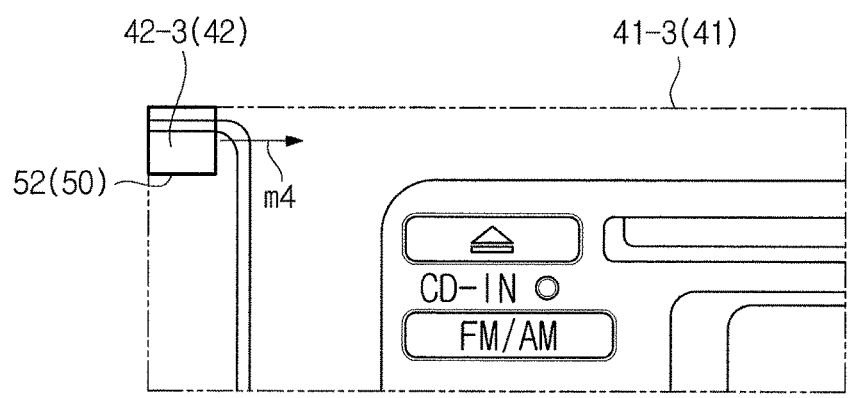
FIG. 19 is a conceptual diagram illustrating an example of movement of the window on a second image.

FIG. 18 is a conceptual diagram illustrating an example of movement of the window on a first image, and FIG. 19 is a conceptual diagram illustrating an example of movement of the window on a second image.

Referring to FIG. 18 and FIG. 19, the processors 110 and 210 may define the same-sized window 50 in each image 40 (41-1, 41-2, 41-3), and may move the defined window 50 according to the predefined information, wherein the processors 110 and 210 may sequentially extract at least one zone 42 from among the plurality of images 40 (41-1, 41-2, 41-3).

In the present case, the plurality of images 40 (41-1, 41-2, 41-3) may have different scales. As a result, assuming that the same-sized window is applied to the plurality of images 40 (41-1, 41-2, 41-3), data pieces contained in zones detected from the plurality of images 40 (41-1, 41-2, 41-3) may be different from each other.

For example, as shown in FIG. 18, when the first window 51 is applied to the first image 41-1 having the smallest scale, a relatively large amount of data may be present in the acquired zone 42-1.

In addition, as shown in FIG. 19, when the second window 52 identical in size and shape to the first window 51 is applied to the second image 41-3 having the largest scale, data contained in the acquired zone 42-2 may be relatively smaller in number than the other data acquired from the first image 41-1.

Assuming that the zone is acquired by applying the sliding window scheme to the image pyramid as described above, detected data pieces are different from each other, wherein different HOGs can also be formed. As a result, other features, which have not been detected in a specific scale, may be detected. For example, assuming that a curved line exists in a left upper end portion of the reference image 40, the gradient for the existing curved line can be acquired from the zone 42-1 of the first image 41-1. However, only the gradient for a straight line constructing some parts of the curved line may be acquired from the zone 42-2 of the second image 41-3. Therefore, after several images 41 having different scales in association with one reference image 40 are formed using the image pyramid, when image data is acquired by detecting the zone for each zone 40 and 41, an object (e.g., a histogram 190) present in the reference image 40 can be more accurately detected.

Figure 20:
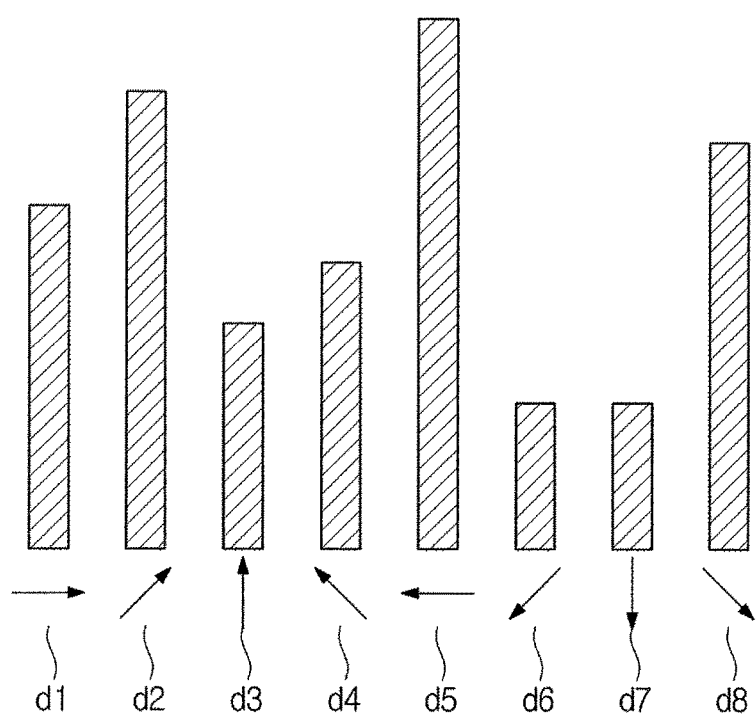
FIG. 20 is a conceptual diagram illustrating an example of the HOG acquired from the first image.

FIG. 20 is a conceptual diagram illustrating an example of the HOG acquired from the first image.

When at least one zone 42-1 or 42-3 is detected from the respective images 40 (41-1, 41-2, 41-3), the processors 110 and 210 may acquire the HOG 55 for at least one cell constructing at least one zone 42-1 or 42-3 as shown in FIG. 20 (512).

The acquisition process 512 of the HOG 55 may be identical to the acquisition process 330 of the HOGs 50, 51, and 52 in the learning data acquisition process 300, or may be partially modified and performed as necessary.

The acquisition process 512 of the HOG 55 may be performed whenever any one zone 42-1 or 42-3 is acquired from any one image 40 or 41 according to designer selection, may be performed after several zones are acquired from any one image 40 or 41, or may be performed after several zones are acquired from all the images 40 and 41.

When the HOG 55 is acquired, an associated descriptor may be acquired (513).

The number of descriptors (i.e., the dimension of descriptors) acquired from any one cell or any one zone may be identical to the number of descriptors acquired from any one cell or any one zone in the learning data acquisition process 300. For example, 8 descriptors may be acquired from any one cell. For example, 128 descriptors may be acquired from any one zone.

In accordance with one embodiment, the descriptor may be normalized as described above (514). In the present case, the direction corresponding to an additional image gradient more relatively detected from among the plurality of image gradients extracted from any one cell may be defined as the representative direction, and normalization of the descriptor may be performed using the representative defined direction.

Normalization 514 of the descriptor may be omitted as necessary.

Figure 21:
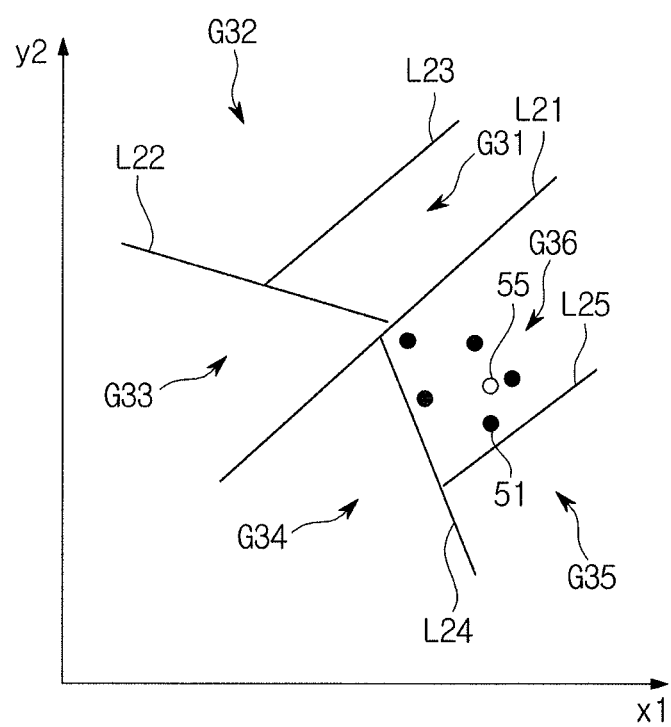
FIG. 21 is a conceptual diagram illustrating an example of the descriptor located at any one hyperplane.

FIG. 21 is a conceptual diagram illustrating an example of the descriptor located at any one hyperplane.

Referring to FIG. 21, the processors 110 and 210 may detect the division space G36, that is acquired as described above or includes an additionally normalized descriptor, from among the division spaces G31, G32, G33, G34, G35, and G36 stored in at least one of the storage device 130 of the pictogram recognition apparatus 100 and the storage device 230 of the server apparatus 200 (520).

In the present case, the processors 110 and 210 may call the hyperplanes L20, L21, L22, L23, and L24 used for hyperspace division, and may acquire the division space G36 having the descriptor using the hyperplanes L20, L21, L22, L23, and L24. For example, the processors 110 and 210 may compare the hyperplanes L20, L21, L22, L23, and L24 with the descriptor, and may determine which division space G36 includes the descriptor on the basis of the comparison result.

The detection process 520 of the division space G36 having the descriptor 85 may be omitted as necessary.

When the division space G36 having the descriptor is detected, the processors 110 and 210 may acquire at least one learning data 131 (132, 133, 134, 135) contained in the detected division space G36, and may compare the acquired learning data 131 (132, 133, 134, 135) with the descriptor (522).

In accordance with one embodiment, the processors 110 and 210 may determine not only at least one learning data contained in the division space G36, but also the distance between the descriptors, and may detect one learning data having the shortest determined distance. In the present case, the processors 110 and 210 may also detect all the learning data in which the distance to the descriptor is shorter than a predefined threshold value.

Figure 22:
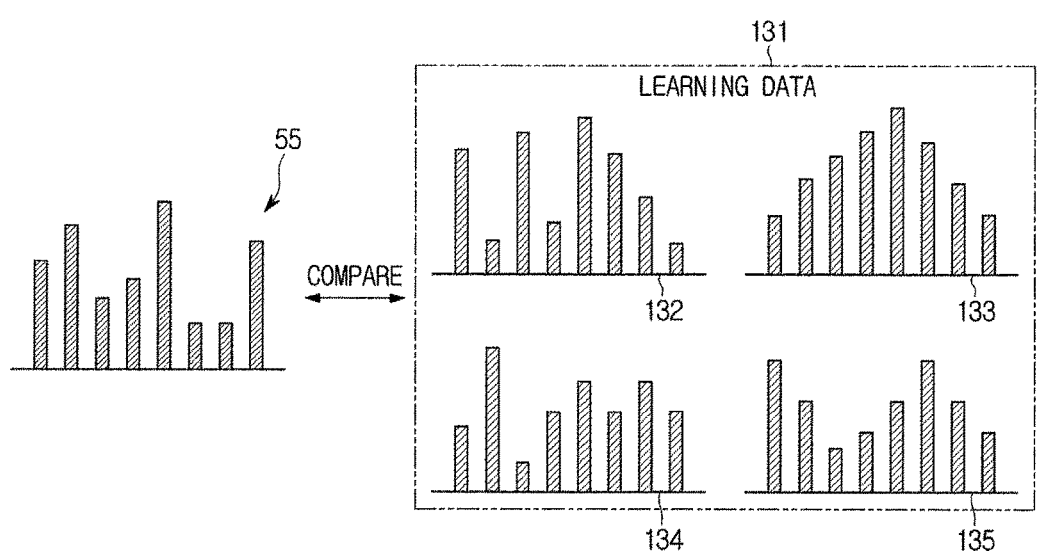
FIG. 22 is a conceptual diagram illustrating the process for searching for the descriptor.

FIG. 22 is a conceptual diagram illustrating the process for searching for the descriptor.

Referring to FIG. 22, when the division space G36 having the descriptor is not detected, the processors 110 and 210 may also compare the HOG 55 acquired from the pictogram recognition process 500 with at least one HOG 132 to 135 stored as the learning data 131, comparing the learning data with the descriptor.

From among the HOGs 132 to 135 stored as the learning data 131, the processors 110 and 210 may detect the HOGs 132 to 135 identical or similar to the HOG 55 acquired from the pictogram recognition process 500, and may store the detection result.

When the learning data is detected, the pictogram corresponding to the detected learned data may be acquired, wherein the pictogram corresponding to the pictogram 10 of the image can be acquired. Therefore, the processors 110 and 210 may recognize the pictogram 10 contained in the image.

In accordance with one embodiment, when the learning data is detected as described above, the processors 110 and 210 may perform grouping of the descriptors having the same detection result (522).

The processors 110 and 210 may perform the grouping of descriptors having the same learning result from among a plurality of descriptors related to a plurality of cells. For example, the processors 110 and 210 may perform the grouping of descriptors identical or similar to the detected learning.

In the present case, the descriptors acquired from different zones 42-1 and 42-3 may be simultaneously grouped. In addition, the descriptors acquired from different images 40 (41-1, 41-2, 41-3) may also be simultaneously grouped. In other words, the descriptors corresponding to the respective cells configured to construct the respective zones 42-1 and 42-3 contained in the respective zones 40 (41-1, 41-2, 41-3) may be compared with each other, and the descriptors having the same images may be combined into one group according to the result of comparison.

Subsequently, the processors 110 and 210 may determine whether the descriptors contained in the respective groups are adjacent to each other within the image (523). In the present case, the processors 110 and 210 may determine whether the descriptors contained in the respective groups are adjacent to each other within the same image 40 (41-1, 41-2, 41-3).

When the descriptors contained in the respective groups are adjacent to each other ("YES" in 523), successful recognition of the pictogram 10 is determined (524).

When the descriptors contained in the respective groups are not adjacent to each other ("NO" in 523), the pictogram recognition apparatus 100 may inform the user of an occurrence of errors under the control of the processors 110 and 210 (540). For example, the pictogram recognition apparatus 100 may display information indicating the presence or absence of errors through the display 151 of the user interface (UI) 150.

When such errors are detected, the pictogram recognition apparatus 100 may repeatedly perform the recognition processes 510 to 523 of the pictogram 10 according to a user manipulation or predefined setting ("YES" in 541), or may finish the recognition process of the pictogram 10 ("NO" in 541).

When recognition of the pictogram 10 contained in image data is completed, information corresponding to the recognized pictogram may be displayed as shown in FIG. 3 (600).

Figure 23:
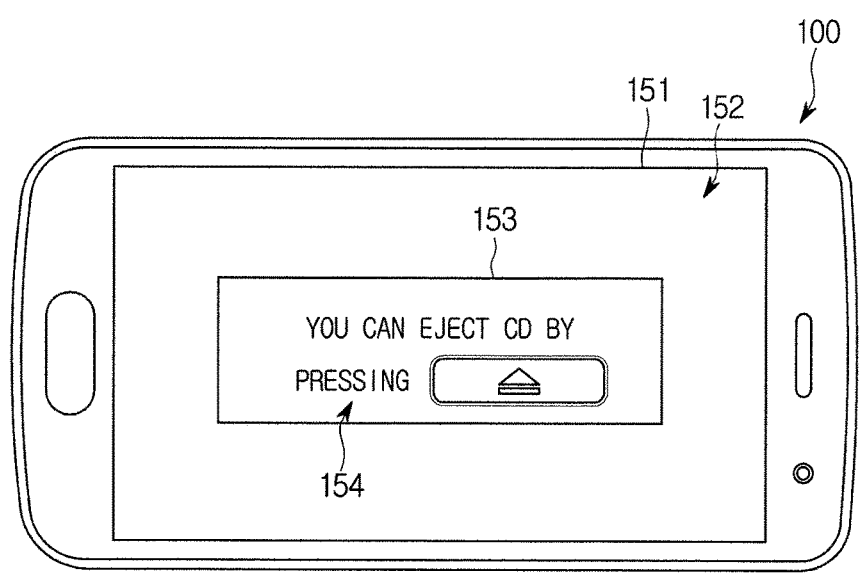
FIG. 23 is a view illustrating an example in which detailed description of the pictogram is displayed on the pictogram recognition apparatus.

FIG. 23 is a view illustrating an example in which detailed description of the pictogram is displayed on the pictogram recognition apparatus.

In more detail, as shown in FIG. 16, when recognition of the pictogram 10 is completed, the processor 110 of the pictogram recognition apparatus 100 or the processor 210 of the server apparatus 200 may read the pictogram information 139 and 239 stored in the storage devices 130 and 230, may detect the pictogram corresponding to the pictogram 10, and may detect and acquire information corresponding to the detected pictogram (610). The acquired information may include information corresponding to the recognized pictogram 10.

When information corresponding to the pictogram 10 is acquired, the user interface 150 (UI) of the pictogram recognition apparatus 100 may provide the user with information regarding the pictogram 10. The user interface (UI) 150 may visibly and or audibly provide information regarding the pictogram 10.

For example, as shown in FIG. 23, the display 151 of the pictogram recognition apparatus 100 may display a screen image 152 according to the recognition result. The screen image 152 according to the recognition result may include the pictogram 153 and detailed description 154 of the pictogram 153. The pictogram 153 and the detailed description 154 of the pictogram 153 may be displayed on all or some zones of the screen image 152.

The display 151 may also display a plurality of pictograms 153 and a plurality of description parts 154 regarding the plurality of pictograms 153.

In accordance with one embodiment, the display 151 may also display the plurality of pictograms 153 and the plurality of description parts 154 regarding the plurality of pictograms 153 on a single screen image 152. In accordance with another exemplary embodiment, the display 151 may sequentially display the plurality of pictograms 153 and the plurality of description parts regarding the plurality of pictograms 153 on the screen image 152. In the present case, the display 151 may sequentially display the plurality of description parts 154 regarding the plurality of pictograms 153 according to a user manipulation or predefined setting.

As is apparent from the above description, the pictogram recognition apparatus, the pictogram recognition system, and the pictogram recognition method according to the embodiments of the present invention can more correctly recognize a pictogram printed or displayed on an instrument panel or the like of a vehicle or other mechanical machines, wherein a user can conveniently, easily and rapidly acquire information regarding the pictogram.

Even when a pictogram is added or the meaning of a specific pictogram is changed, the pictogram recognition apparatus, the pictogram recognition system, and the pictogram recognition method according to the embodiments of the present invention can rapidly update information regarding the added pictogram or information regarding the specific pictogram having the changed meaning, and can properly provide a user with the updated information.

The pictogram recognition apparatus, the pictogram recognition system, and the pictogram recognition method according to the embodiments of the present invention can easily and rapidly acquire information of a pictogram printed or displayed on the vehicle or mechanical machine using a terminal device, wherein the necessity of a paper manual related to the pictogram is reduced.

The pictogram recognition apparatus, the pictogram recognition system, and the pictogram recognition method according to the embodiments of the present invention can allow a user to recognize the meaning of a pictogram displayed on an instrument panel of the vehicle without searching for the paper manual, wherein the user can easily and conveniently manage the vehicle.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for recognizing a pictogram, the method comprising:
    acquiring, by a pictogram recognition apparatus or a server apparatus, learning data;
    acquiring, by the pictogram recognition apparatus, an image including the pictogram;
    extracting, by the pictogram recognition apparatus or a server apparatus, at least one zone from the image;
    acquiring, by the pictogram recognition apparatus or the server apparatus, a descriptor corresponding to the at least one zone;
    recognizing, by the pictogram recognition apparatus or the server apparatus, the pictogram by comparing the descriptor with the learning data;
    providing, by the pictogram recognition apparatus, a user with information corresponding to the recognized pictogram;
    wherein the acquiring the learning data includes:
        acquiring a plurality of learning descriptors from a learning image; and
        locating a plurality of descriptors in a hyperspace, determining a hyperplane needed for hyperspace division according to distribution of the plurality of learning descriptors, and acquiring a plurality of division spaces according to the determined hyperplane, and
    wherein the locating the plurality of descriptors in the hyperspace and the determining the hyperplane needed for the hyperspace division according to distribution of the plurality of learning descriptors includes:
        determining the hyperplane configured to perform the hyperspace division on a basis of at least one of predetermined information, that indicates whether numbers of learning descriptors contained in the plurality of division spaces are substantially identical to each other, and a relative size of a ratio of a product of two standard deviations of the plurality of division spaces to a distance between average values of a respective division space.

2. The method according to claim 1, wherein the extracting the at least one zone from the image includes:
    establishing a window in the image, detecting a zone partitioned by the window, and thus extracting the at least one zone; and
    moving the window.

3. The method according to claim 1, wherein the extracting the at least one zone from the image includes:
    acquiring an image pyramid from the image; and
    extracting at least one zone from each zone of the image pyramid.

4. The method according to claim 1, wherein the acquiring the descriptor corresponding to the at least one zone includes:
    acquiring a Histogram of Oriented Gradient (HOG) regarding at least one cell constructing the at least one zone; and
    acquiring a descriptor regarding the at least one cell using a Histogram of Oriented Gradient (HOG) regarding the at least one cell.

5. The method according to claim 4, wherein the acquiring the descriptor corresponding to the at least one zone further includes:
    acquiring a descriptor regarding the at least one zone by combining HOG (Histogram of Oriented Gradient) regarding at least one cell.

6. The method according to claim 1, wherein the recognizing the pictogram by comparing the descriptor with the learning data includes:
comparing the descriptor with the learning data; and
detecting a descriptor substantially identical to the descriptor.

7. The method according to claim 6, wherein the recognizing the pictogram by comparing the descriptor with the learning data includes:
grouping a descriptor substantially identical to the learning data from a plurality of descriptors extracted from the at least one zone into a single group;
determining whether the descriptors contained in a same group are located at different contiguous positions within the image; and
determining success or failure of pictogram recognition according to the determined result.

8. The method according to claim 1, wherein the recognizing the pictogram by comparing the descriptor with the learning data includes:
detecting a division space having the descriptor from the plurality of division spaces; and
detecting learning data on a basis of a distance between the descriptor and a learning descriptor contained in the division space.

9. An apparatus for recognizing a pictogram the apparatus comprising:
an image acquisition part configured to acquire an image having the pictogram;
a storage device configured to store learning data;
a processor configured to extract at least one zone from the image, acquire a descriptor corresponding to the at least one zone, and recognize the pictogram by comparing the descriptor with the learning data; and
a user interface (UI) configured to provide a user with information corresponding to the recognized pictogram,
wherein the processor is configured to acquire leaning data by acquiring a plurality of learning descriptors from a teaming image and to locate the plurality of learning descriptors in a hyperspace, to determine a hyperplane needed for hyperspace division according to distribution of a plurality of descriptors, and to acquire a plurality of division spaces according to the determined hyperplane, and
wherein the processor is configured to determine the hyperplane configured to perform the hyperspace division on a basis of at least one of predetermined information, that indicates whether numbers of learning descriptors contained in the plurality of division spaces are substantially identical to each other, and a relative size of a ratio of a product of two standard deviations of the plurality of division spaces to a distance between average values of a respective division space.

10. The apparatus according to claim 9, wherein the processor establishes a window in the image, is configured to extract the at least one zone by detecting a zone partitioned by the window, and moves the window.

11. The apparatus according to claim 9, wherein the processor acquires an image pyramid from the image, and is configured to extract at least one zone from each image of the image pyramid.

12. The apparatus according to claim 9, wherein the processor acquires a Histogram of Oriented Gradient (HOG) regarding at least one cell constructing the at least one zone, and acquires a descriptor regarding the at least one cell using the HOG regarding the at least one cell.

13. The apparatus according to claim 12, wherein the processor acquires a descriptor regarding the at least one zone by combining a Histogram of Oriented Gradient (HOG) regarding at least one cell.

14. The apparatus according to claim 9, wherein the processor is configured to compare the descriptor with the learning data, and is configured to detect a descriptor substantially identical to the descriptor.

15. The apparatus according to claim 14, wherein the processor groups a descriptor substantially identical to the learning data from a plurality of descriptors extracted from the at least one zone into at least one group, is configured to determine whether descriptors contained in a same group are located adjacent to each other within the image, and is configured to determine success or failure of pictogram recognition according to the determined result.

16. The apparatus according to claim 9, wherein the processor is configured to detect a division space having the descriptor from the plurality of division spaces, and is configured to detect learning data on a basis of a distance between a descriptor corresponding to the at least one zone and a learning descriptor contained in the division space.

17. A system for recognizing a pictogram, the system comprising:
a server apparatus; and
a terminal apparatus configured to communicate with the server apparatus, acquire an image having the pictogram, and provide a user with information regarding a recognized pictogram,
wherein at least one of the server apparatus and the terminal apparatus performs at least one of an operation for extracting at least one zone from the image, an operation for acquiring a descriptor corresponding to the at least one zone, and an operation for performing pictogram recognition by comparing the descriptor with learning data,
wherein the at least one of the server apparatus and the terminal apparatus is configured to acquire learning data by acquiring a plurality of learning descriptors from a learning image and to locate the plurality of learning descriptors in a hyperspace, to determine a hyperplane needed for hyperspace division according to distribution of a plurality of descriptors, and to acquire a plurality of division spaces according to the determined hyperplane, and
wherein the at least one of the server apparatus and the terminal apparatus is configured to determine the hyperplane configured to perform the hyperspace division on a basis of at least one of predetermined information, that indicates whether numbers of learning descriptors contained in the plurality of division spaces are substantially identical to each other, and a relative size of a ratio of a product of two standard deviations of the plurality of division spaces to a distance between average values of a respective division space.

* * * * *